Patented Oct. 9, 1928.

1,686,703

UNITED STATES PATENT OFFICE.

HERBERT T. LEO, OF CORONA, CALIFORNIA.

SOLID ACID MATERIAL.

No Drawing.     Application filed January 31, 1927. Serial No. 165,030.

This invention relates to solid acid material and to a process of making the same from acids or acid solutions.

In many instances, it would be of great advantage to be able to obtain acids that are normally marketed in liquid form, either as 100% acid or as concentrated acid solution, in a solid form. In the making of jams and jellies and in the confectionery and baking industries, large quantities of various acids, such as acetic, phosphoric, lactic, and the like, are employed and the handling of these acids in liquid form is a matter of considerable inconvenience. Heretofore, no known methods were available for marketing such acids in a solid form.

It is therefore an object of this invention to provide a solid acid material and a process for making the same in a simple and economical method, whereby various acids may be marketed in solid form, thus avoiding the inconveniences and danger attendant upon handling concentrated liquid acids.

Other and further important objects of this invention will be apparent from the disclosures in the specification and the appended claims.

In general, my process consists in dehydrating an inert food substance capable of crystallizing with water of crystallization, as for instance certain of the monosaccharides, and more especially the aldohexose sugars, and combining with the dehydrated substance a liquid acid or a concentrated solution of an acid in place of the water of crystallization. The aldohexose which I prefer to use, both because of its availability and cheapness, is a refined dextrose, commonly known as cerelose and produced by the hydrolysis of corn starch. Dextrose normally forms crystals containing at least one molecule of water of crystallization for each molecule of dextrose, but under certain conditions dextrose will form solid hydrates in which the crystals are in a magma. The water of crystallization may, however, be driven out by heating the dextrose, preferably to a temperature near its melting point, 146 to 148° C. I take advantage of this fact in preparing solid acid materials by the addition of an acid or acid solution to dehydrated dextrose. The acid is thereby caused to take the place of the water of crystallization, the dextrose crystallizing out with the acid, chemically or physically, combined with the dextrose molecules.

My process, in the preferred form, is illustrated as follows:

About 80 parts of pure dextrose are heated up to near the melting point of the dextrose for a sufficient period of time to drive off the water of crystallization. The dehydrated dextrose is then allowed to cool to a point where the liquid acid or acid solution may be added. Various acids or acid solutions, such as phosphoric acid, lactic acid, acetic acid, or malic acid, and the like, may be used. Assuming phosphoric acid to be used, a solution of about 50% concentration is added to the dehydrated dextrose. The mass is then well mixed and set aside to cool. The speed of the crystallizing action may be increased by adding crystals of dextrose to the mass, which will eventually set into a solid homogeneous body entirely free of liquid. Ordinarily no evaporation will take place or is necessary to effect the crystallization process. After hardening, the mass may be shaved into chips or ground into a white granular powder.

Since dextrose is soluble in water up to 81 parts in 100, it is only necessary in using the solid acid materials thus produced to add sufficient water to dissolve the acid material. Obviously, any suitable dilution of the solid acid material may be employed, or in instances where it is desirable to use the solid material without first dissolving, said solid material may be added directly in powdered form to the other ingredients employed in the particular process. On account of the non-hygroscopic nature of the solid acid material, it may be shipped and stored in bulk, without the ordinary inconveniences in handling liquid acids.

It will be appreciated that various proportions of dextrose to acid content may be used, the important requirement being that the proportion is such as to produce a solid product free of liquid. The proportions will naturally vary in accordance with the purpose for which the solid mass of material is made.

While the product and process have been described in connection with the manufacture of food products, it will be appreciated that the invention is applicable to any acid that is normally liquid in nature or is capable of forming a concentrated water solution.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. As a new article of manufacture, a non-deliquescent solid comprising dextrose and a normally liquid acid incorporated therewith.

2. A non-hygroscopic solid substance comprising dextrose having a strong acid reaction.

3. A homogeneous solid substance comprising an inert food ingredient capable of forming crystals containing water of crystallization and a normally liquid acid combined with said ingredient in place of the water of crystallization.

4. A solid acid material, comprising a monosaccharide, the molecules of which are normally capable of crystallizing with water of crystallization and a concentrated acid solution replacing said water of crystallization in the monosaccharide molecule.

5. A solid acid material, comprising crystalline dextrose containing phosphoric acid in combination therewith.

6. The process of making solid acid material, which comprises dehydrating an inert food substance capable of crystallizing with water of crystallization, adding to said dehydrated substance a liquid acid and allowing the mixture to crystallize into a solid mass.

7. The process of making solid acid material, which comprises crystallizing dextrose with an acid solution to obtain a solid free of liquid.

8. The process of making solid acid material, which comprises heating dextrose until the water of crystallization is expelled, adding a normally liquid acid thereto and allowing the mass so formed to harden into a solid, free of liquid and non-hygroscopic.

In testimony whereof I have hereunto subscribed my name at Chicago, Cook County, Illinois.

HERBERT T. LEO.